(12) United States Patent
Rinehart et al.

(10) Patent No.: US 7,578,104 B2
(45) Date of Patent: Aug. 25, 2009

(54) EXTERNAL PRESSURE PLATE GLAZING ELEMENT

(75) Inventors: David M. Rinehart, Montgomery, AL (US); Charles Anthony Smith, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 3 days.

(21) Appl. No.: 12/033,388

(22) Filed: Feb. 19, 2008

(65) Prior Publication Data

US 2008/0138564 A1  Jun. 12, 2008

(51) Int. Cl.
*E06B 7/00* (2006.01)
(52) U.S. Cl. .................. 52/204.593; 52/204.7
(58) Field of Classification Search .......... 428/99, 428/192; 52/208, 204.593, 204.69, 204.7, 52/786.11
See application file for complete search history.

(56) References Cited

U.S. PATENT DOCUMENTS

| | | | |
|---|---|---|---|
| 3,404,134 A | 10/1968 | Rees | |
| 3,843,193 A | 10/1974 | Krings et al. | |
| 3,866,374 A | 2/1975 | Dallen | |
| 4,004,388 A | 1/1977 | Stefanik | |
| 4,406,105 A | 9/1983 | Colvin | |
| 4,799,346 A | 1/1989 | Bolton et al. | |
| 4,799,376 A | 1/1989 | Siedlecki, Jr. et al. | |
| 4,960,631 A | 10/1990 | Walters et al. | |
| 5,355,645 A | 10/1994 | Farag | |
| 5,373,672 A | 12/1994 | Schulz | |
| 5,567,529 A | 10/1996 | Smith | |
| 5,592,795 A | 1/1997 | Rinehart et al. | |
| 5,908,674 A | 6/1999 | Schindler et al. | |
| 5,960,606 A | 10/1999 | Dlubak | |
| 6,737,141 B2 | 5/2004 | Makolin et al. | |

(Continued)

FOREIGN PATENT DOCUMENTS

EP  0 525 690 B1  2/1993

(Continued)

OTHER PUBLICATIONS

PCT International Search Report for International Application No. PCT/US2004/010413, dated Aug. 10, 2004.

*Primary Examiner*—Richard E Chilcot, Jr.
*Assistant Examiner*—Jessica Laux
(74) *Attorney, Agent, or Firm*—George M. Medwick

(57) ABSTRACT

This invention is an architectural glazing structure for exterior mounting that is a glass laminate having enhanced resistance to being pulled from a frame upon being subjected to severe positive and/or negative pressure loads. This invention is particularly suitable for architectural structures having windows that can be subjected to the extreme conditions prevalent in a hurricane, or window that can be placed under severe stress from repeated forceful blows to the laminate.

7 Claims, 7 Drawing Sheets

U.S. PATENT DOCUMENTS

| | | | |
|---|---|---|---|
| 2001/0023562 A1 | 9/2001 | Blobaum et al. | |
| 2003/0022015 A1 | 1/2003 | Wong | |
| 2003/0066256 A1* | 4/2003 | DeBlock et al. | 52/208 |
| 2003/0124296 A1 | 7/2003 | Smith | |
| 2004/0006939 A1 | 1/2004 | Jobs et al. | |
| 2004/0221526 A1 | 11/2004 | Rinehart et al. | |
| 2004/0234730 A1 | 11/2004 | Rinehart et al. | |
| 2005/0042422 A1 | 2/2005 | Bennison et al. | |
| 2005/0118445 A1 | 6/2005 | Wong et al. | |
| 2005/0202264 A1 | 9/2005 | Smith et al. | |
| 2005/0233125 A1 | 10/2005 | Anderson et al. | |
| 2005/0266187 A1 | 12/2005 | Smith et al. | |
| 2006/0005482 A1 | 1/2006 | Bennison et al. | |
| 2006/0141212 A1 | 6/2006 | Smith et al. | |

FOREIGN PATENT DOCUMENTS

| | | |
|---|---|---|
| EP | 0 775 789 A1 | 5/1997 |
| GB | 2 150 200 A | 6/1985 |
| WO | WO 93/02269 | 2/1993 |
| WO | WO 98/28515 | 7/1998 |
| WO | WO 99/58334 | 11/1999 |
| WO | WO 00/64670 | 11/2000 |

* cited by examiner

EXTERNAL PRESSURE PLATE GLAZING ELEMENT

This application claims benefit of U.S. patent application Ser. No. 10/817,628, filed Apr. 2, 2004, which matured into U.S. Pat. No. 7,334,371, issued Feb. 26, 2008, which itself claimed benefit of U.S. Provisional Application No. 60/460,676, filed Apr. 4, 2003.

BACKGROUND OF THE INVENTION

1. Field of the Invention

This invention relates to laminated glass structures. This invention particularly relates to laminated glass structures that can withstand severe impact and/or severe pressure loads.

2. Description of the Prior Art

Conventional glazing structures comprise a glazing element mounted in or to a support structure such as a frame. Such glazing elements can comprise a laminate window, such as a glass/interlayer/glass laminate window. There are various glazing methods known and which are conventional for constructing windows, doors, or other glazing elements for commercial and/or residential buildings. Such glazing methods are, for example: exterior pressure plate glazing; flush glazing; marine glazing; removable stop glazing; and, silicone structural glazing (also known as stopless glazing).

For example, U.S. Pat. No. 4,406,105 describes a structurally glazed system whereby holes are created through the glazing element and a plate member system with a connection being formed through the hole.

Threat-resistant windows and glass structures are known and can be constructed utilizing conventional glazing methods. U.S. Pat. No. 5,960,606 ('606) and U.S. Pat. No. 4,799,376 ('376) each describes laminate windows that are made to withstand severe forces. In International Publication Number WO 98/28515 (IPN '515) a glass laminate is positioned in a rigid channel in which a resilient material adjacent to the glass permits flexing movement between the resilient material and the rigid channel. Other means of holding glazing panels exist such as adhesive tapes, gaskets, putty, and the like and can be used to secure panels to a frame. For example, WO 93/002269 describes the use of a stiffening member that is laminated to a polymeric interlayer around the periphery of a glass laminate to stiffen the interlayer, which can extend beyond the edge of the glass/interlayer laminate. In another embodiment, '269 describes the use of a rigid member, which is inserted into a channel below the surface of a monolithic transparency, and extending from the transparency.

Windows and glass structures capable of withstanding hurricane-force winds and high force impacts are not trouble-free, however. Conventional glazing methods can require that the glazing element have some extra space in the frame to facilitate insertion or removal of the glazing element. While the additional space facilitates installation, it allows the glazing element to move in a swinging, rocking, or rotational motion within the frame. Further, it can move from side to side (that is, in the transverse direction) in the frame depending upon the magnitude and direction of the force applied against the glazing element. Under conditions of severe repetitive impact and/or either continuous or discontinuous pressure, a glass laminate can move within the frame or structural support in such a way that there can be sufficient stress built up to eventually fracture the window and allow the laminate to be pulled out of the frame. For example, when subjected to severe hurricane force winds the flexing movement in the windows of IPN '515, wherein glass flexes within a rigid channel, can gradually pull the laminate out of the channel resulting in loss of integrity of the structure. In '376, the glass held against the frame can be broken and crushed, causing a loss of structural integrity in the window/frame structure. In WO '269, inserting a stiff foreign body into the interlayer as described therein can set up the structure for failure at the interface where the polymer contacts the foreign body when subjected to severe stresses.

WO 00/64670 describes glass laminates that utilize the interlayer as a structural element in glazing structures thereby providing greater structural integrity to the laminate during duress or after initial fracture of the glass.

SUMMARY OF THE INVENTION

In one aspect, the present invention is a glazing element useful for exterior pressure plate glazing comprising a transparent laminate and an attachment means for attaching the laminate to a support structure wherein: (1) the laminate comprises at least one layer of glass bonded directly to a thermoplastic polymer interlayer on at least one surface of the glass; (2) the interlayer extends beyond at least one edge of the laminate; (3) one surface of the extended portion of the interlayer is bonded to at least one surface of the attachment means; (4) another surface of the extended portion of the interlayer is bonded to the glass; (5) the attachment means is a clip useful for aligning and holding the laminate in a retaining channel of the support structure; (6) the clip further comprises at least one interlocking extension useful for restricting rotational and/or transverse movement of the laminate within the channel and/or movement of the laminate out of the channel.

DETAILED DESCRIPTION OF THE INVENTION

Figure 1:
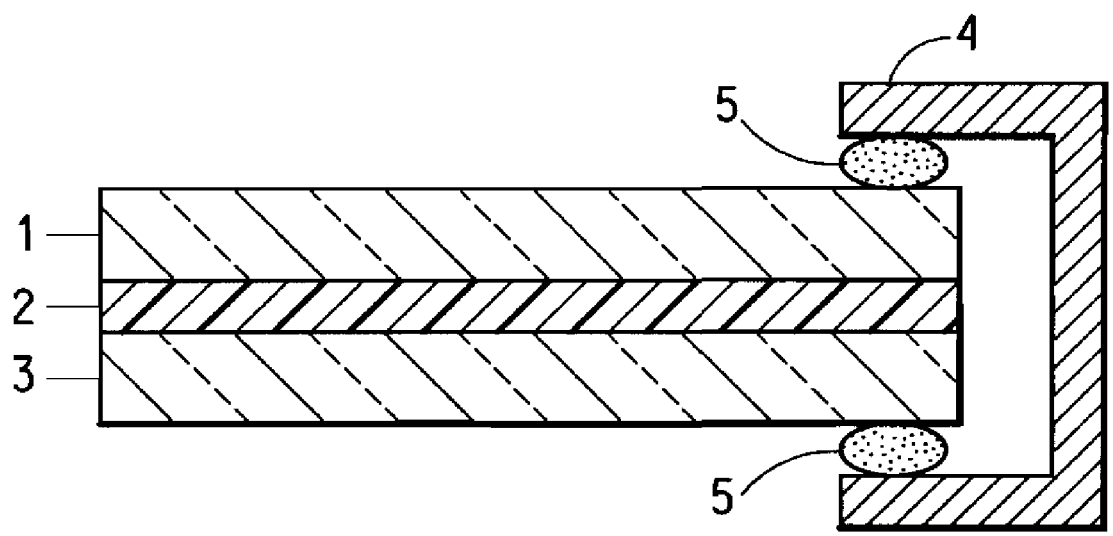
FIG. 1 is a conventional glass laminate in a frame.

FIG. 1 shows a conventional laminate comprising glass (1), a thermoplastic interlayer (2) and glass (3), the glass being attached to a frame (4) through an intermediary adhesive layer (5) which is typically a gasket, putty, sealant tape, or silicone sealant.

The present invention is a glass laminate system that utilizes the interlayer for the purpose of attaching the laminate to the support structure, as described in WO 00/64670, hereby incorporated by reference. In a process for producing glazing units for architectural applications that incorporate the interlayer as a structural element of the glazing, it has now been found that attaching the interlayer of a glass laminate to a support structure for the laminate can provide glazing units having improved strength and structural integrity against severe threats. The present invention relates to glazing elements that are constructed for exterior pressure plate glazing applications and which utilize the interlayer to attach to the structural support.

In a conventional exterior pressure plate glazing application, the glazing element is typically inserted into a frame, which comprises a mullion and a pressure plate. The mullion and pressure plate are useful for the purpose of providing an attachment for the glazing element to the building or structure being fitted with the glazing element. The pressure plate is used in concert with the mullion to hold the glazing element securely in place in the frame. The pressure plate is attached to the mullion using a fastener.

In one embodiment, the glazing element of this invention comprises a support structure capable of supporting a glazing structure comprising a laminate having at least one layer of glass and at least one thermoplastic polymer interlayer that is self-adhered directly to at least one surface of the glass. By self-adhered, it is meant that the interlayer/glass interface does not require and therefore possibly may not include any intervening layers of adhesives and/or glass surface pre-treatment to obtain bonding suitable for use as a safety glass. In some applications it is preferable that there is no intervening film or adhesive layer.

Thermoplastic polymers useful in the practice of the present invention should have properties that allow the interlayer to provide conventional advantages to the glazing, such as transparency to light, adhesion to glass, and other known and desirable properties of an interlayer material. In this regard, conventional interlayer materials can be suitable for use herein. Conventional interlayer materials include thermoplastic polymers. Suitable polymers include, for example; polyvinylbutyrals (PVB); polyvinyl chlorides (PVC); polyurethanes (PUR); polyvinyl acetate; ethylene acid copolymers and their ionomers; polyesters; copolyesters; polyacetals; and others known in the art of manufacturing glass laminates. Blended materials using any compatible combination of these materials can be suitable, as well. In addition, a suitable interlayer material for use in the practice of the present invention should be able to resist tearing away from a support structure under extreme stress. A sheet of a suitable polymer for use in the practice of the present invention has a high modulus, excellent tear strength and excellent adhesion directly to glass. As such, a suitable interlayer material or material blend should have a Storage Young's Modulus of at least 50 MPa at temperatures up to about 40° C. It can be useful to vary the thickness of the interlayer in order to enhance the tear strength, for example.

While many conventional thermoplastic polymers can be suitable for use in the practice of the present invention, preferably the polymer is an ethylene acid copolymer. More preferably the thermoplastic polymer is an ethylene acid copolymer obtained by the copolymerization of ethylene and a $\alpha,\beta$-unsaturated carboxylic acid, or derivatives thereof. Suitable derivatives of acids useful in the practice of the present invention are known to those skilled in the art, and include esters, salts, anhydrides, amides, nitrites, and the like. Acid copolymers can be fully or partially neutralized to the salt (or partial salt). Fully or partially neutralized acid copolymers are known conventionally as ionomers. Suitable copolymers can include an optional third monomeric constituent that can be an ester of an ethylenically unsaturated carboxylic acid. Suitable acid copolymers useful in the practice of the present invention can be purchased commercially from, for example, E.I. DuPont de Nemours & Company under the trade names of Surlyn® and Nucrel®, for example.

In the practice of the present invention the edges of the interlayer can be attached either directly to a support structure or indirectly to the support structure by way of an attachment means. As contemplated in the practice of the present invention, a support structure can be any structural element or any combination of structural elements that hold the glazing element in place on the building or support the weight of the glazing element. The support structure can comprise a frame, bolt, screw, wire, cable, nail, staple, and/or any conventional means for holding or supporting a glazing element, or any combination thereof. In the present invention, "support structure" can mean the complete or total support structure, or it can refer to a particular structural component or element of the complete support structure. One skilled in the art of glazing manufacture will know from the context which specific meaning to apply. Direct attachment of the interlayer, as contemplated herein, means a direct attachment of the laminate to the support structure or any element thereof wherein the interlayer is in direct and consistent contact with the support structure. Direct attachment of the interlayer to the support can be from the top, sides, bottom, or through the interlayer material. By indirect attachment it is meant any mode of attachment wherein the interlayer does not have direct contact with the support structure, but does have contact with the support structure through at least one intervening structural component of the glazing element. Indirect attachment of the interlayer to the support structure by way of an attachment means is most preferable in the practice of the present invention. The attachment means can be any means for holding or constraining the glass laminate into a frame or other support structure.

In a preferred embodiment, the attachment means is an attachment clip that can be bonded to an extended portion of the interlayer by a bonding process. In the practice of the present invention there is no direct contact intended between the clip and any portion of the glass layer(s) of the laminate, and any such contact is incidental. In any event, it can be preferred to minimize contact between the clip and the glass in order to reduce glass fracture under stress or during movement of the laminate in the support structure. To that end, the portion of the interlayer that extends from the edges of the laminate preferably forms an intervening layer between the clip and the glass layer such that the clip does not contact the glass. The surface of the clip that contacts the interlayer can be smooth, but preferably the surface of the clip has at least one projection and/or one recessed area, and more preferably several projections and/or recessed areas, which can provide additional surface area for bonding as well as a mechanical interlocking mechanism with the interlayer to enhance the effectiveness of the adhesive bonding between the dip and the interlayer, thereby providing a laminate/dip assembly with greater structural integrity.

In another embodiment, a conventional glass laminate unit can be used to create a laminate glazing unit of the present invention. To achieve the same or similar effect as in other embodiments, the interlayer material can be bonded to the thermoplastic material without the necessity of actually extending the interlayer beyond the edges of the laminate. In this embodiment, strips of thermoplastic polymer material suitable for bonding to the thermoplastic interlayer can be positioned on the periphery of the laminate and heated to promote melting, or flow, of the interlayer and the thermoplastic polymer on the periphery of the laminate such that the two materials come into direct contact and become blended.

Upon cooling below the melting point of the polymers, the two materials will be bonded to one another and thus be available to perform the bonding function between the glass and the attachment means. Other processes for bonding the interlayer to the attachment means can be contemplated and within the scope of the present invention if the interlayer is effectively extended outside the edges of the laminate by that process. The thermoplastic polymer can be the same polymer as used for the interlayer, or it can be a different material that forms a strong enough bond with the interlayer material under the process conditions used. In a preferred embodiment bonding the thermoplastic strips to the glass of the laminate and to the attachment means can be performed simultaneously.

A bonding process suitable for use in the practice of the present invention is any wherein the interlayer can be bonded to the attachment means. In the present invention, by "bonding" it is meant that the interlayer and the attachment means form a bond that results in adhesion between the attachment means and the interlayer. Bonding can be accomplished by physical means or by chemical means, or by a combination of both. Physical bonding, for the purposes of the present invention, is adhesion that results from interaction of the interlayer with the attachment means wherein the chemical nature of the interlayer and/or the attachment means is unchanged at the surfaces where the adhesion exists. For example, adhesion that results from intermolecular forces, wherein covalent chemical bonds are neither created nor destroyed, is an example of physical bonding. Chemical bonding, according to the present invention, would require forming and/or breaking covalent chemical bonds at the interface between the interlayer and the attachment means in order to produce adhesion.

The bonding process of the present invention preferably comprises the step of applying heat to the dip while it is in direct contact with the interlayer, that is, applying heat or energy to a clip/interlayer assembly such that the polymeric interlayer and the clip are bonded at the interface where the clip and interlayer are in contact. Without being held to theory, it is believed that this results in a physical bonding rather than a chemical bonding. Application of heat in the bonding process can be accomplished by various methods, including the use of: a heated tool; microwave energy; or ultrasound to heat the interlayer and/or the attachment clip and promote bonding. Preferably the clip/interlayer assembly can be bonded at a temperature of less than about 175° C., more preferably at a temperature of less than about 165° C. Most preferably, the clip/interlayer assembly can be bonded at a temperature of from about 125° C. to about 150° C. Once bonded, the clip/interlayer/laminate form a laminate/clip assembly that can be fitted or otherwise attached to a frame or other support structure.

A clip that is suitable for use in the practice of the present invention has a mechanical interlocking extension that can, by interlocking with the support structure, reduce the motion available to the laminate in the channel of a frame, or against any other rigid support structure member. The extension member of the clip can thereby reduce the force of the rigid support structure against the laminate and also assist in holding the laminate in or to the support structure. The extension member can have various forms and/or shapes to accomplish its function. For example, the extension member can form part of a ball and socket; it can form a "C", an "L", or a "T" shape to hold it into the support structure, or it can be any sort of extension arm such as a hook or a clamp, for example. Any design of the extension member, which accomplishes the function of facilitating the laminate being held into the support structure, is contemplated as within the scope of the present invention.

For the purposes of this invention, a laminate/clip assembly of the present invention is said to be attached to a support structure if the assembly is nailed, screwed, bolted, glued, slotted, tied or otherwise constrained from becoming detached from the structure. Preferably, a laminate/clip assembly of the present invention is geometrically and/or physically constrained within a channel formed by elements of a conventional framing structure. In the practice of the present invention, a conventional framing structure comprises a mullion which functions to attach and hold a glazing element to a building, for example. A framing structure useful in the practice of the present invention can comprise a pressure plate and a fastener which functions to hold a glazing element in place against the mullion. Use of pressure plates and mullions in the glazing art for exterior glazing is conventional.

Figure 2:
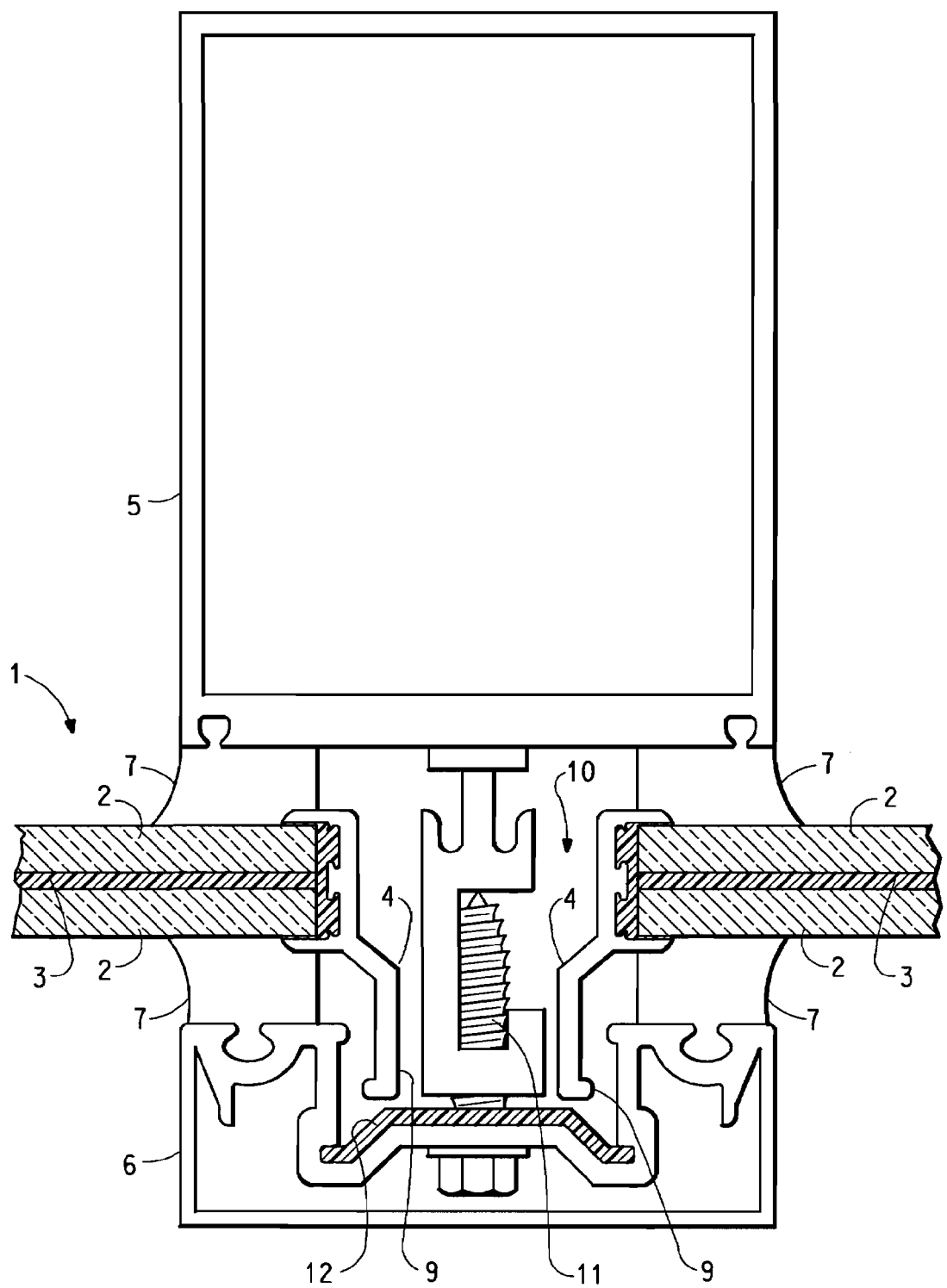
FIG. 2 is a glass/plastic/glass laminate of the present invention comprising a thermoplastic interlayer, wherein the laminate is held in a channel formed from a mullion and a pressure plate, the laminate being held in place with the assistance of an attachment means bonded to the thermoplastic interlayer.

In one of the preferred embodiments of the present invention, depicted in FIG. 2, a glazing element (1) comprises: a glass (2)/interlayer (3)/glass (2) laminate; and an attachment clip (4). The glazing element is contacted by gaskets (7), which assist in holding the glazing element in a channel formed by a mullion (5) and a pressure plate (6). The attachment clip comprises an interlocking extension (9), which projects outward and away from the outer edge of the laminate. The arm can function to restrict the movement of the glazing element within the frame channel (10) by cutting down on the rocking motion available to the laminate upon being subjected to positive pressure at the surfaces of the laminate. In addition, the arm can assist in keeping the laminate from being pulled out by movement of the glazing element from side to side. The fastener (11) holds the pressure plate and mullion together, and can be tightened or loosened to apply more or less pressure to the gaskets holding the glazing element. A thermal separator (12) can be used for temperature insulation. The design depicted in FIG. 2 results in a laminate that can withstand either severe positive pressure or negative pressure loads. The clip can optionally comprise an engagement hook at the end of the extension, to assist in retaining the laminate in the frame channel.

Figure 3:
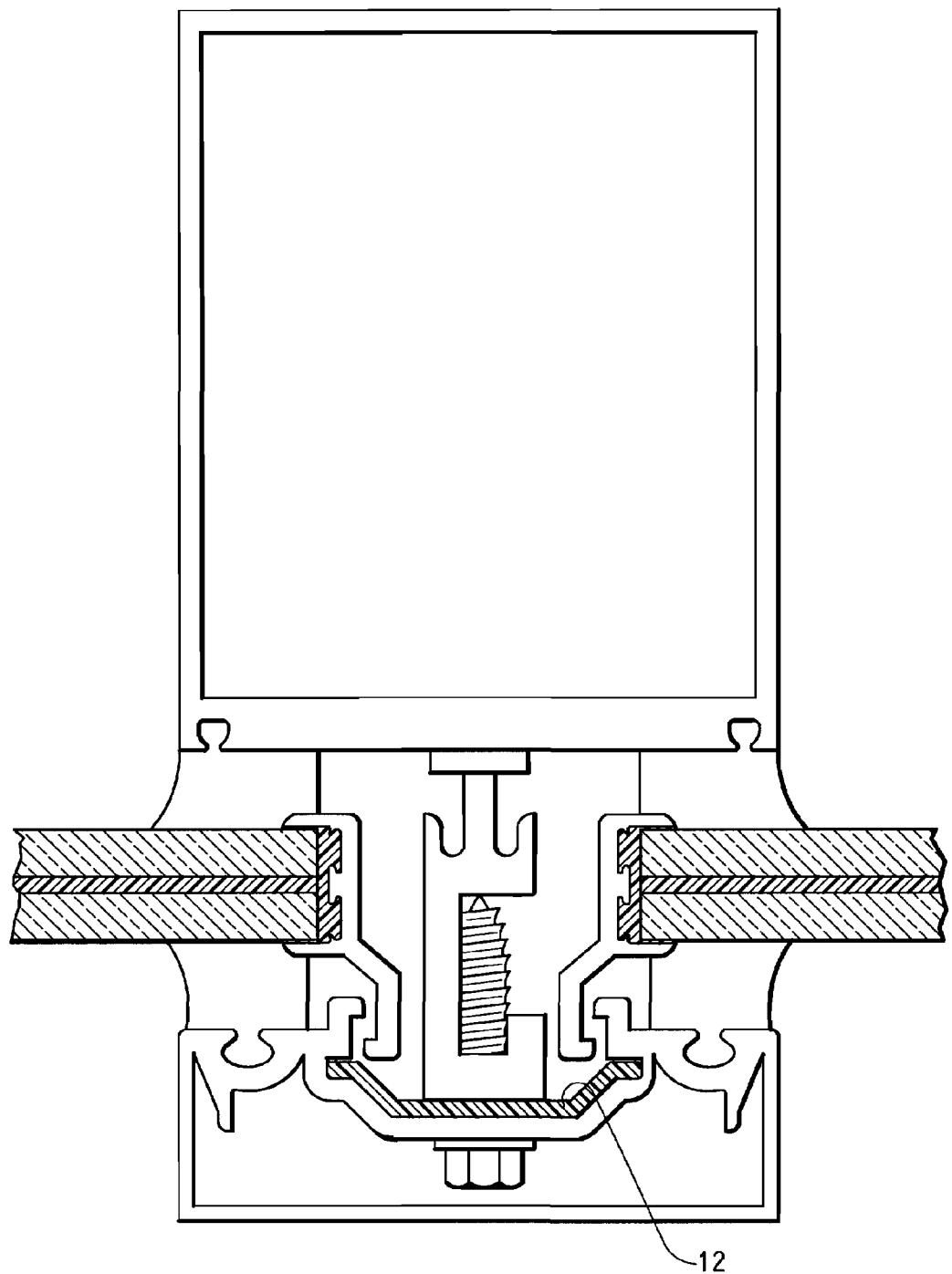
FIG. 3 depicts a glazing element having a reduced moment arm compared with the glazing element of FIG. 2 due to a redesigned pressure plate.

In another embodiment depicted in FIG. 3, the glazing element shown therein is identical to the glazing element of FIG. 2. The mullion and pressure plate are identical to FIG. 2 except that the shape of the thermal separator (12) has been redesigned and inverted in order to reduce the moment arm of the glazing element. The reduced moment arm can further restrict the movement in the channel in a manner that can prevent sufficient force being generated to damage the laminate and/or allow the laminate to be pulled from the structure.

Figure 4:
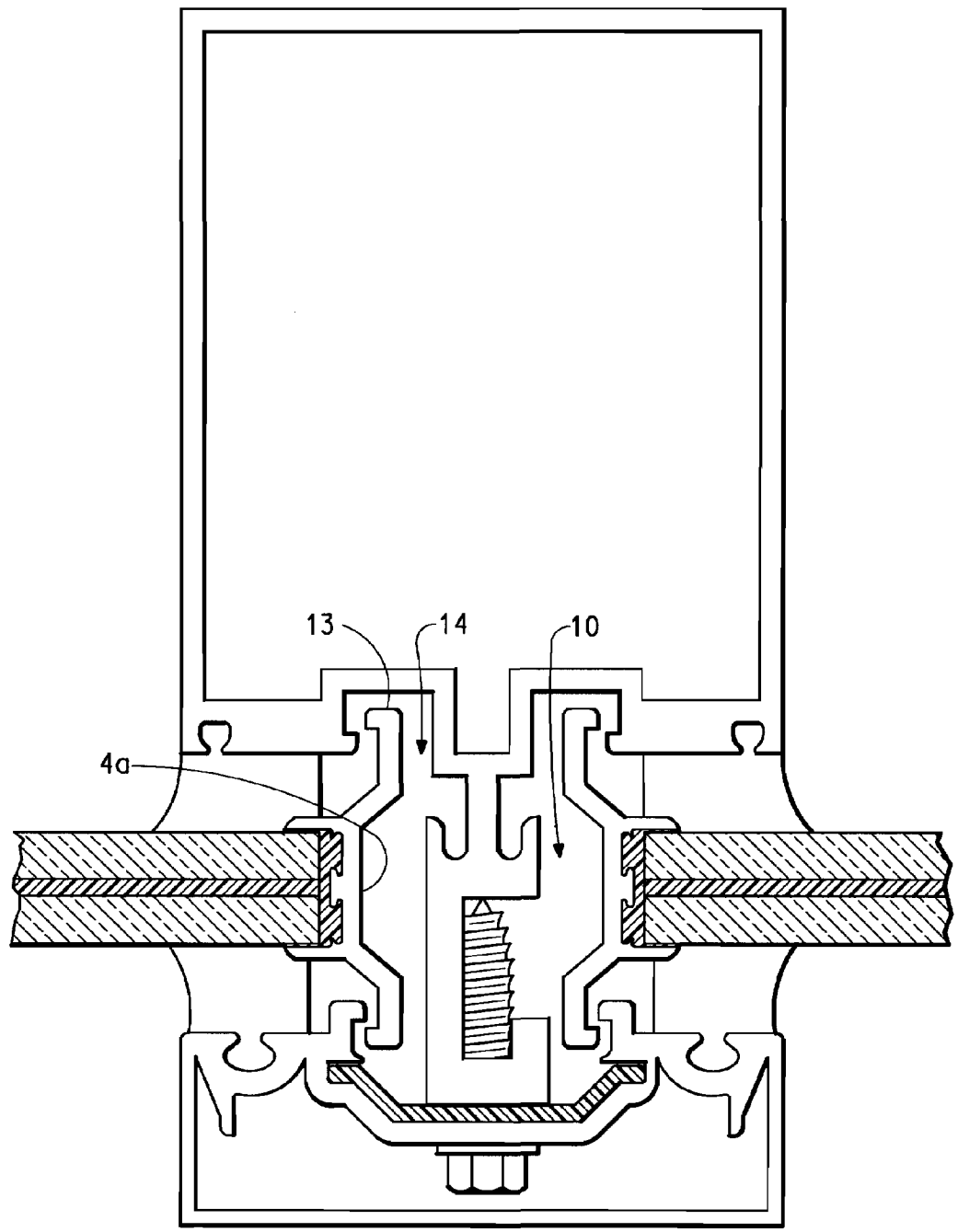
FIG. 4 depicts a glazing element comprising an attachment means having two symmetrical extensions and a redesigned mullion having recesses for accepting and constraining one of the extensions.

In another embodiment depicted in FIG. 4, the glazing element is identical to the glazing element of FIG. 3, except that the attachment clip (4a) comprises a second extension arm (13), which functions to further promote retention of the glazing element in the channel (10) whether subject to either positive or negative pressure. The mullion of FIG. 4 has a recess (14) to accept the additional extension arm.

Figure 5:
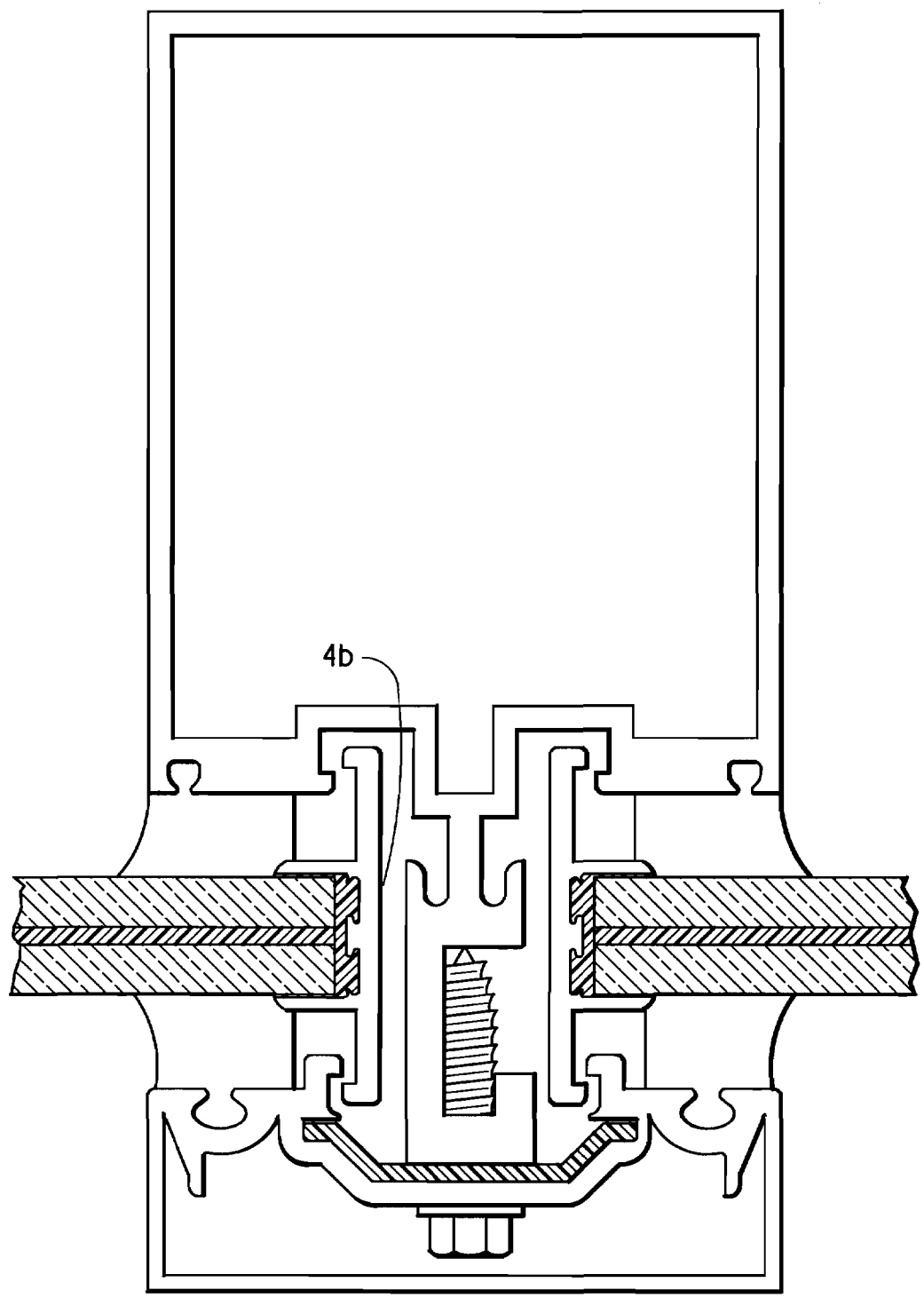
FIG. 5 depicts an attachment clip having two symmetrical extensions and a flattened surface.

In another preferred embodiment depicted in FIG. 5, the glazing element is identical to the glazing element of FIG. 3, except that the attachment clip (4b) has a flattened surface, which is more amenable to the application of heat during the clip/interlayer bonding process. The modified design of the clip in FIG. 5 can result in greater glass capture or glass bite, of the laminate in the frame, which can result in greater structural integrity for the glazing element. The mullion of FIG. 5 is identical to the mullion of FIG. 4.

Figure 6:
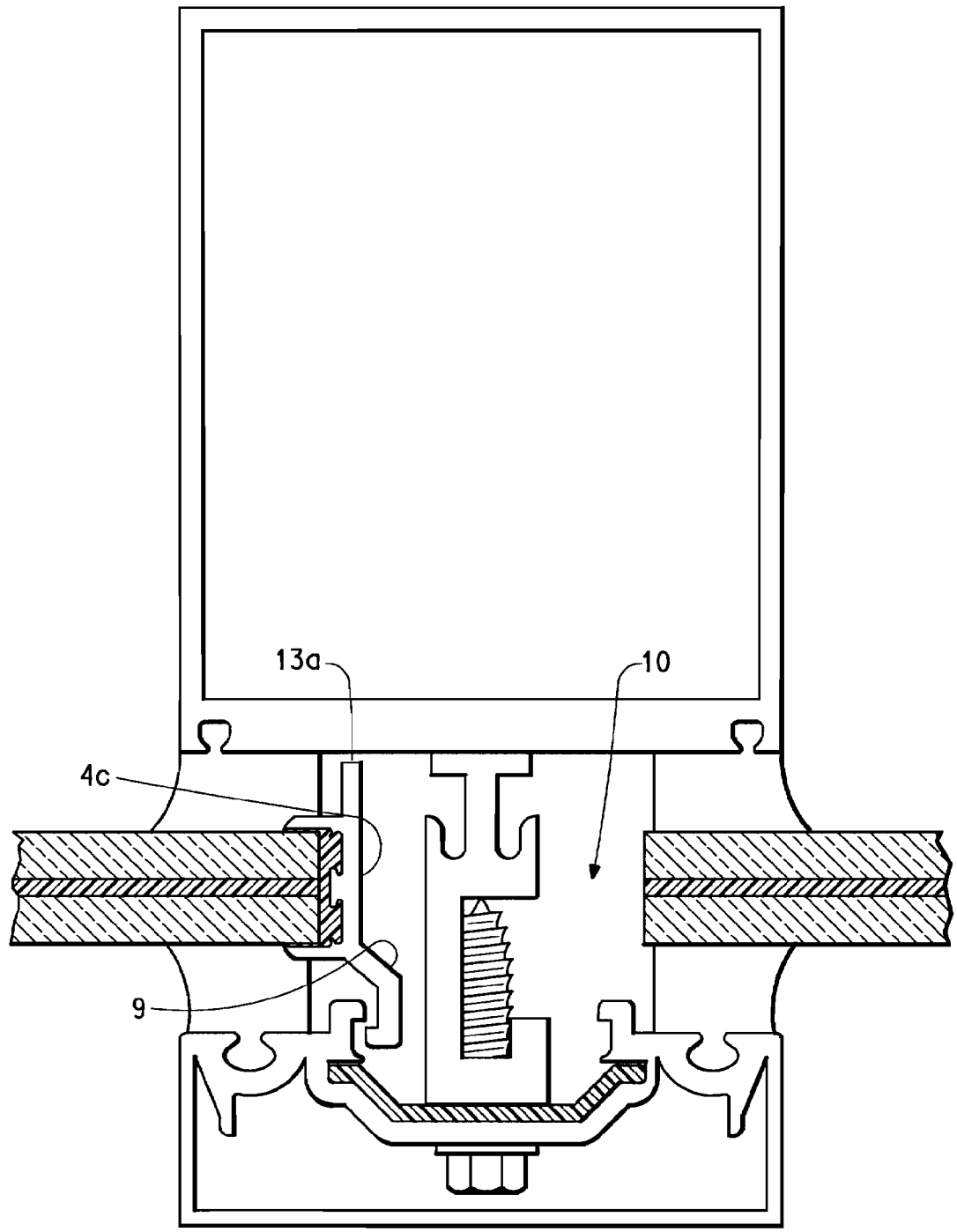
FIG. 6 depicts an attachment clip having two extensions that are not identical.

In still another preferred embodiment shown in FIG. 6, the glazing element is identical to the glazing element of FIG. 3, except that the attachment clip (4c) comprises a second extension arm (13a) that is shorter than extension arm (9), and functions to promote retention of the glazing element in the channel (10) whether subject to either positive or negative pressure. The mullion of FIG. 6 is identical to the mullion of FIG. 3.

Figure 7:
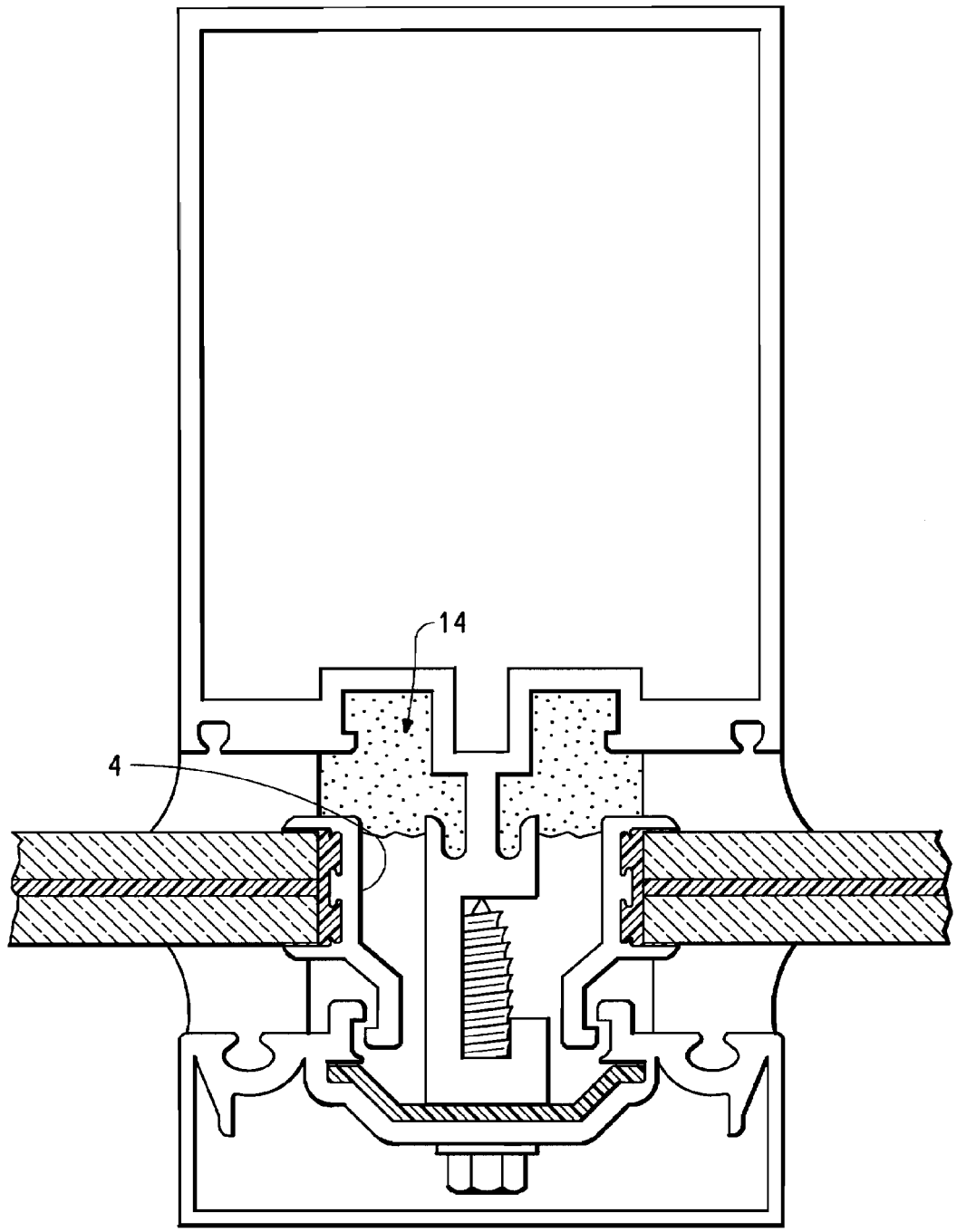
FIG. 7 depicts an attachment clip having one extension and an adhesive applied inside the channel to restrict rocking of the glazing under negative pressure.

In still another preferred embodiment shown in FIG. 7, the glazing element is identical to the glazing element of FIG. 3, except that the attachment clip (4) is bonded to the mullion by an adhesive (14). While an adhesive is optional in the practice of the present invention, use of an adhesive in this manner does not require great skill and technical prowess to apply the adhesive because the adhesive is not visible outside of the frame of the glazing element.

A laminate of the present invention has excellent durability, impact resistance, toughness, and resistance by the interlayer to cuts inflicted by glass once the glass is shattered. A laminate of the present invention is particularly useful in architectural applications in buildings subjected to hurricanes and windstorms. A laminate of the present invention that is attached or mounted in a frame by way of the interlayer is not torn from the frame after such stress or attack. A laminate of the present invention also has a low haze and excellent transparency. These properties make glazing elements of the present invention useful as architectural glass, including use for reduction of solar rays, sound control, safety, and security, for example.

In a preferred embodiment, the interlayer is positioned between the glass plates such that the interlayer is exposed in such a manner that it can be attached to the surrounding frame. The interlayer can be attached to the support structure in a continuous manner along the perimeter of the laminate. Alternatively, the interlayer can be attached to the structural support in a discontinuous manner at various points around the perimeter of the laminate. Any manner of attaching the laminate to the frame by way of the interlayer is considered to be within the scope of the present invention. For example, the frame surrounding the laminate can contain interlayer material that can bond with the laminate and also with the frame; the laminate can be mechanically anchored to the frame with a screw, hook, nail, or clamp, for example. Mechanical attachment includes any physical constraint of the laminate by slotting, fitting, or molding a support to hold the interlayer in place within the structural support.

Air can be removed from between the layers of the laminate, and the interlayer can be bonded, or adhered, to the glass plates by conventional means, including applying heat and pressure to the structure. In a preferred embodiment, the interlayer can be bonded without applying increased pressure to the structure.

One preferred laminate of this invention is a transparent laminate comprising two layers of glass and an intermediate thermoplastic polymer interlayer self-adhered to at least one of the glass surfaces. The interlayer preferably has a Storage Young's Modulus of 50-1,000 MPa (mega Pascals) at 0.3 Hz and 25° C., and preferably from about 100 to about 500 MPa, as determined according to ASTM D 5026-95a. The interlayer should remain in the 50-1,000 MPa range of its Storage Young's Modulus at temperatures up to 40° C.

The laminate can be prepared according to conventional processes known in the art. For example, in a typical process, the interlayer is placed between two pieces of annealed float glass of dimension 12"×12" (305 mm×305 mm) and 2.5 mm nominal thickness, which have been washed and rinsed in demineralized water. The glass/interlayer/glass assembly is then heated in an oven set at 90-100° C. for 30 minutes. Thereafter, it is passed through a set of nip rolls (roll pressing) so that most of the air in the void spaces between the glass and the interlayer may be squeezed out, and the edge of the assembly sealed. The assembly at this stage is called a pre-press. The pre-press is then placed in an air autoclave where the temperature is raised to 135° C. and the pressure raised to 200 psig (14.3 bar). These conditions are maintained for 20 minutes, after which, the air is cooled while no more air is added to the autoclave. After 20 minutes of cooling when the air temperature in the autoclave is less than 50° C., the excess air pressure is vented. Obvious variants of this process will be known to those of ordinary skill in the art of glass lamination, and these obvious variants are contemplated as suitable for use in the practice of the present invention.

Preferably, the interlayer of the laminate is a sheet of an ionomer resin, wherein the ionomer resin is a water insoluble salt of a polymer of ethylene and methacrylic acid or acrylic acid, containing about 14-24% by weight of the acid and about 76-86% by weight of ethylene. The ionomer further characterized by having about 10-80% of the acid neutralized with a metallic ion, preferably a sodium ion, and the ionomer has a melt index of about 0.5-50. Melt index is determined at 190° C. according to ASTM D1238. The preparation of ionomer resins is disclosed in U.S. Pat. No. 3,404,134. Known methods can be used to obtain an ionomer resin with suitable optical properties. However, current commercially available acid copolymers do not have an acid content of greater than about 20%. If the behavior of currently available acid copolymer and ionomer resins can predict the behavior of resins having higher acid content, then high acid resins should be suitable for use herein.

Haze and transparency of laminates of this invention are measured according to ASTM D-1003-61 using a Hazeguard XL211 hazemeter or Hazeguard Plus Hazemeter (BYK Gardner-USA). Percent haze is the diffusive light transmission as a percent of the total light transmission. To be considered suitable for architectural and transportation uses. The interlayer of the laminates generally is required to have a transparency of at least 90% and a haze of less than 5%.

In the practice of the present invention, use of a primer or adhesive layer can be optional. Elimination of the use of a primer can remove a process step and reduce the cost of the process, which can be preferred.

Standard techniques can be used to form the resin interlayer sheet. For example, compression molding, injection molding, extrusion and/or calendaring can be used. Preferably, conventional extrusion techniques are used. In a typical process, an ionomer resin suitable for use in the present invention can include recycled ionomer resin as well as virgin ionomer resin. Additives such a colorants, antioxidants and UV stabilizers can be charged into a conventional extruder and melt blended and passed through a cartridge type melt filter for contamination removal. The melt can be extruded through a die and pulled through calendar rolls to form sheet about 0.38-4.6 mm thick. Typical colorants that can be used in the ionomer resin sheet are, for example, a bluing agent to reduce yellowing or a whitening agent or a colorant can be added to color the glass or to control solar light.

The polymer sheet after extrusion can have a smooth surface but preferably has a roughened surface to effectively allow most of the air to be removed from between the surfaces in the laminate during the lamination process. This can be accomplished for example, by mechanically embossing the sheet after extrusion or by melt fracture during extrusion of the sheet and the like. Air can be removed from between the layers of the laminate by any conventional method such as nip roll pressing, vacuum bagging, or autoclaving the pre-laminate structure.

The Figures do not represent all variations thought to be within the scope of the present invention. One of ordinary skill in the art of glazing manufacture would know how to incorporate the teachings of the present invention into the conventional art without departing from the scope of the inventions described herein. Any variation of glass/interlayer/glass laminate assembly wherein a frame can be attached to the interlayer—either directly or indirectly through an intermediary layer, for example an adhesive layer, is believed to be within the scope of the present invention.

For architectural uses a laminate can have two layers of glass and an interlayer of a thermoplastic polymer. Multilayer interlayers are conventional and, can be suitable for use herein, provided that at least one of the layers can be attached to the support structure as described herein. A laminate of the present invention can have an overall thickness of about 3-30 mm. The interlayer can have a thickness of about 0.38-4.6 mm and each glass layer can be at least 1 mm thick. In a preferred embodiment, the interlayer is self-adhered directly to the glass, that is, an intermediate adhesive layer or coating between the glass and the interlayer is not used. Other laminate constructions can be used such as, for example, multiple layers of glass and thermoplastic interlayers; or a single layer of glass with a thermoplastic polymer interlayer, having adhered to the interlayer a layer of a durable transparent plastic film. Any of the above laminates can be coated with conventional abrasion resistant coatings that are known in the art.

The frame and/or the attachment means can be fabricated from a variety of materials such as, for example: wood; aluminum; steel; and various strong plastic materials including polyvinyl chloride and nylon. Depending on the material used and the type of installation, the frame may or may not be required to overlay the laminate in order to obtain a fairly rigid adhesive bond between the frame and the laminate interlayer.

The frame can be selected from the many available frame designs in the glazing art. The laminate can be attached, or secured, to the frame with or without use of an adhesive material. It has been found that an interlayer made from ionomer resin self-adheres securely to most frame materials, such as wood, steel, aluminum and plastics. In some applications it may be desirable to use additional fasteners such as screws, bolts, and clamps along the edge of the frame. Any means of anchoring the attachment means to the frame is suitable for use in the present invention.

In preparing the glazing elements of this invention, autoclaving can be optional. Steps well known in the art such as: roll pressing; vacuum ring or bag pre-pressing; or vacuum ring or bagging; can be used to prepare the laminates of the present invention. In any case, the component layers are brought into intimate contact and processed into a final laminate, which is free of bubbles and has good optics and adequate properties to insure laminate performance over the service life of the application. In these processes the objective is to squeeze out or force out a large portion of the air from between the glass and plastic layer(s). In one embodiment the frame can serve as a vacuum ring. The application of external pressure, in addition to driving out air, brings the glass and plastic layers into direct contact and adhesion develops.

For architectural uses in coastal areas, the laminate of glass/interlayer/glass must pass a simulated hurricane impact and cycling test which measures resistance of a laminate to debris impact and wind pressure cycling. A currently acceptable test is performed in accordance to the South Florida Building Code Chapter 23, section 2315 Impact tests for wind born debris. Fatigue load testing is determined according to Table 23-F of section 2314.5, dated 1994. This test simulates the forces of the wind plus air born debris impacts during severe weather, e.g., a hurricane. A sample 35 inches×50 inches (88.9×127 cm) of the laminate is tested. The test consists of two impacts on the laminate (one in the center of the laminate sample followed by a second impact in a corner of the laminate). The impacts are done by launching a 9-pound (4.1 kilograms) board nominally 2 inches (5 cm) by 4 inches (10 cm) and 8 feet (2.43 meters) long at 50 feet/second (15.2 meters/second) from an air pressure cannon. If the laminate survives the above impact sequence, it is subjected to an air pressure cycling test. In this test, the laminate is securely fastened to a chamber. In the positive pressure test, the laminate with the impact side outward is fastened to the chamber and a vacuum is applied to the chamber and then varied to correspond with the cycling sequences set forth in Table 1. The pressure cycling schedule, shown in Table 1, is specified as a fraction of the maximum pressure (P). In this test P equals 70 PSF (pounds per square foot), or 3360 Pascals. Each cycle of the first 3500 cycles and subsequent cycles is completed in about 1-3 seconds. On completion of the positive pressure test sequence, the laminate is reversed with the impact side facing inward to the chamber for the negative pressure portion of the test and a vacuum is applied corresponding to the following cycling sequence. The values are expressed as negative values

TABLE 1

| Number of Air Pressure Cycles | Pressure Schedule* | Pressure Range [pounds per square foot (Pascals)] |
|---|---|---|
| Positive Pressure (inward acting) | | |
| 3,500 | 0.2 P to 0.5 P | 14 to 35 (672-1680 Pascals) |
| 300 | 0.0 P to 0.6 P | 0 to 42 (0-2016 Pascals) |
| 600 | 0.5 P to 0.8 P | 35 to 56 (1680-2688 Pascals) |
| 100 | 0.3 P to 1.0 P | 21 to 70 (1008-3360 Pascals) |
| Negative Pressure (outward acting) | | |
| 50 | −0.3 P to −1.0 P | −21 to −70 (−1008 to −3360 Pascals) |
| 1,060 | −0.5 P to −0.8 P | −35 to −56 (−1680 to −2688 Pascals) |
| 50 | 0.0 P to −0.6 P | −0 to −42 (0 to −2016 Pascals) |
| 3,350 | −0.2 P to −0.5 P | −14 to −35 (−672 to −1680 Pascals) |

*Absolute pressure level where P is 70 pounds per square foot (3360 Pascals).

A laminate passes the impact and cycling test when there are no tears or openings over 5 inches (12.7 cm) in length and not greater than 1/16 inch (0.16 cm) in width.

Other applications may require additional testing to determine whether the glazing is suitable for that particular application. A glazing membrane and corresponding support structure can fail by one of three failure modes:

1. The glazing membrane breaches (a tear or hole develops) as a result of a force being applied to the glazing or surrounding structure.
2. The glazing membrane pulls away or from the support structure losing mechanical integrity such that the glazing membrane no longer provides the intended function, generally a barrier.

3. The support structure fails by loss of integrity within its makeup or loss of integrity between the support structure and the surrounding structure occurs.

Only failure modes 1 and/or 2 defined above are the subject of the present invention.

The best-optimized system is defined herein as one where no failure occurs in any component/subcomponent of the glazing system when the maximum expected 'threat' is applied to the glazing system. When some threshold is exceeded, the ideal failure mode is one where a balance is achieved between failure modes 1 and 2 above. If the glazing membrane itself can withstand substantially more applied force or energy then the support structure has capability to retain the glazing, then the glazing 'infill' is over-designed or the glazing support structure is under-designed. The converse is also true.

EXAMPLES

The Examples are for illustrative purposes only, and are not intended to limit the scope of the invention.

Examples 1 Through 3 and Comparative Examples C1 Through C3

Conventional glass laminates were prepared by the following method. Two sheets of annealed glass having the dimensions of 300 mm×300 mm (12 inches square) were washed with de-ionized water and dried. A sheet (2.3 mm thick) of ionomer resin composed of 81% ethylene, 19% methacrylic acid, with 37% of the acid neutralized and having sodium ion as the counter-ion, and having a melt index of 2 was placed between two pieces of glass. A nylon vacuum bag was placed around the prelaminate assembly to allow substantial removal of air from within (air pressure inside the bag was reduced to below 100 millibar absolute). The bagged prelaminate was heated in a convection air oven to 120° C. and held for 30 minutes. A cooling fan was used to cool the laminate to ambient temperature and the laminate was disconnected from the vacuum source and the bag removed yielding a fully bonded laminate of glass and interlayer.

Laminates of the present invention were prepared in the same manner as above with the following exception. In some of the examples a triangular-shaped 'corner-box' retaining assembly as depicted in FIGS. 6 and 9 of the present application, having a wall thickness of 0.2 mm and dimensions of 50 mm×50 mm×71 mm (inside opening of 10 mm) was placed on each corner of the laminate after fitting pieces of ionomer sheet (2.3 mm thickness) within the inside of the box thereby 'lining' the inside. The assembly was placed into the vacuum bag and the process above was carried out to directly 'bond' the attachment to the interlayer. To better insure that the laminates were free of void areas, that is entrained bubbles, areas of non-contact between the ionomer and glass surface and that good flow and contact was made between the ionomer and the inside of the 'corner-box' all laminates were then placed in an air autoclave for further processing. The pressure and temperature inside the autoclave was increased from ambient to 135° C. and 200 psi in a period of 15 minutes. This temperature and pressure was held for 30 minutes and then the temperature was decreased to 40° C. within a 20-minute period whereby the pressure was lowered to ambient atmospheric pressure and the unit was removed.

A test apparatus similar to that described in SAE Recommended Practice J-2568 (attached as Appendix) was assembled to measure the degree of membrane integrity. The apparatus consisted of a hydraulic cylinder with integral load cell driving a hemispherical metal ram (200 mm diameter) into the center of each glazing sample in a perpendicular manner, measuring the force/deflection characteristics. Deflection was measured with a string-potentiometer attached to the ram. The glazing sample was supported either by a metal frame capturing the sample around the periphery, only at the corners or any configuration where performance information is desired. The data acquisition was done via an interface to a computer system with the appropriate calibration factors. Further treatment of the data was then possible to calculate the Maximum Applied Force ($F_{max}$) in Newtons (N), and the deflection. Integration of the data enabled the derivation the total energy expended in reaching a failure point of the glazing or supporting conditions. Testing of the laminates was done after fracturing the laminate in order to more accurately measure the load-bearing capability of the interlayer attachment system.

Example C1 was an annealed glass plate (10 mm) that was stressed until fracture. The test glazing had a standard installation with all four sides captured by the frame using a typical amount of edge capture (that is, overlap of the frame and glass), and lined with an elastomeric gasket.

Example C2 was a 90-mil polyvinylbutyral (PVB) laminate that was prefractured. The laminate construction was a typical patch plate design.

Example C3 was a 90-mil SentryGlas® Plus (SGP) laminate that was prefractured and constructed with a typical patch plate design.

Example 1 was a laminate of the present invention, using a 90-mil SentryGlas® Plus interlayer that was prefractured and constructed with a full perimeter attachment design (that is, the interlayer was attached to the frame around the full perimeter of the laminate).

Example 2 was the same as Example 1, except that it was constructed with a corner attachment design.

Example 3 was the same as Example 2, except that a 180-mil SentryGlas® Plus laminate that was used.

To measure the relative performance of a glazing membrane capacity against an applied force/energy and the capability for the glazing support structure (or means) to retain the glazing the following testing was performed. The displacement (D), which is defined as the distance traveled by the ram from engaging the laminate to the point of laminate failure, was measured. The membrane strength to integrity (S/R) ratio was measured. The S/R ratio is defined as the ratio of the applied energy required to cause a failure in a given laminate over the applied energy required to break C1. The performance benefit (B) over the traditional patch plate design was calculated by dividing the applied energy required for failure in the laminate by the applied energy required to for failure in C3. The resulting data is supplied in Table 2.

TABLE 2

| Ex | D (mm) | $F_{max}$ (N) | S/R | B |
| --- | --- | --- | --- | --- |
| C1 | 9 | 5284 | 1 | .02 |
| C2 | 122 | 108 | 22 | .5 |
| C3 | 65 | 939 | 45 | 1 |
| 1 | 80 | 11595 | 408 | 9.1 |
| 2 | 80 | 7243 | 274 | 6.1 |
| 3 | 90 | 9003 | 452 | 10.0 |

Examples 4 through 10 and Comparative Example C4 Laminates were prepared using 9/16" thick laminated glass incorporating 0.090" thick SentryGlas® Plus, available from E.I DuPont de Nemours and Company (DuPont) and ¼" heat strengthened glass. In all but one respect this is a common glazing alternative used in commercial glazing applications for large missile impact resistance. The improvement over the existing industry standards is the attachment means used, that is, bonding of aluminum profiles to the laminated glass' interlayer edge with a contact-heating device. The aluminum profile was a "u" channel shape with a leg extending from the base of the "u" engaging an interlocking profile design in a custom extruded pressure plate. The 12" long aluminum profiles were positioned around the glass edge in strategic locations to determine the most optimal location for load transfer within the glazed system. The attachment means geometry used for design validation was purposely designed to minimally impact the framing system into which it was installed. Because of this, the structural performance on inward acting air pressure cyclical loads behaved differently within the system than outward acting air pressure loads. This allowed for validation that the design of the attachment means of the present invention did indeed provide a substantial improvement over conventionally dry glazed systems.

Eight different individual test specimens were subjected to the test procedures required for large missile impact resistance with the location of the attachment means of the present invention varying with each test specimen. Example C4 was tested without any attachments of the present invention to define a baseline performance standard for a dry-glazed application with ½" glass bite. Each test specimen was 63" wide×120" high and was mounted in a steel test frame to simulate a punched opening installation in a building.

All of the tested specimens passed the required impact resistance with a 2"×4" wooden missile weighing 9# and traveling at 50 feet/second. The results of the cycling test for the various test specimens are shown in Table 3. Pressure cycling was conducted according to the Pressure Schedule shown in Table 1. A laminate of the present invention is given a passing mark for (+) load if the laminate holds in the support structure at 4500 cycles in the positive load direction and a passing mark in the (−) load direction at 4500 cycles in the negative load direction. The test laminates (with the exception of the comparative example) were designed so that the attachment means of the present invention was only engaged in the (+) load direction, and retention under negative load would be nearly identical to conventional laminates.

The units that failed in the negative load direction demonstrated precisely how much of an improvement the attachment means provided the installation. Given that without the attachment means, the limitation for a framing of this type, dry-glazed, with ½" glass bite is about a 50 PSF design pressure differential. Through testing at least a doubling of the effective design pressure differential to 100 PSF was demonstrated. It is contemplated that higher-pressure loads would have been obtainable had the interior extruded aluminum profiles been designed to accept the attachment clips as well.

TABLE 3

| Ex | Pressure | Results | Cycles (no.) |
|---|---|---|---|
| C4 | +/−50 PSF | Passed +/− loads | 9000 |
| 4 | +/−100 PSF | Failed + load | 4424 |
| 5 | +/−100 PSF | Failed + load | 3800 |
| 6 | +/−100 PSF | Failed + load | 4416 |
| 7 | +/−100 PSF | Passed + load | 4509 |
| 8 | +/−100 PSF | Passed + load | 4502 |
| 9 | +/−100 PSF | Failed + load | 4409 |
| 10 | +/−100 PSF | Passed + load | 4500 |

Examples 11 Through 15, C5 and C6

Laminates of the present invention were constructed similarly to FIGS. 2 and 3 (Examples 11-13) and FIGS. 4 and 5 (Examples 14 and 15). The tensile force required to failure was measured on unbroken laminates and on intentionally broken laminates. Examples 13 and 14 utilized aluminum (Al) frames which were modified with grooves to allow the polymer to flow into channels in the surface of the frames, creating additional mechanical interlocking of polymer to frame. The results are shown in Table 4.

TABLE 4

| Example | Frame Style | Pre-test Damage | Tensile Force (lbs) |
|---|---|---|---|
| C5 | gasket | unbroken | 24.7 |
| C6 | silicone | unbroken | 40.7 |
| 11 | Aluminum | unbroken | 265.9 |
| 12 | Aluminum | broken | 166.7 |
| 13 | Al(grooved) | broken | 77.4 |
| 14 | Al(grooved) | unbroken | 440.1 |
| 15 | Aluminum | broken | 210.4 |

What is claimed is:

1. An exterior pressure plate glazing element comprising a transparent laminate and an attachment means for holding the laminate in, or attaching the laminate to, a support structure, the support structure having a retaining channel formed therein,
   (a) a laminate having at least one glass layer bonded to a thermoplastic polymer interlayer,
      the glass layer having first and second planar surfaces and an edge,
      the thermoplastic polymer interlayer being directly bonded to one of the planar surfaces of the glass layer,
      a portion of the thermoplastic polymer interlayer extending past and overlying the edge of the glass layer, and
   (b) an attachment clip for holding the laminate in or attaching the laminate to the support structure, the attachment clip including a mounting portion and an arm,
      the mounting portion of the attachment clip being bonded directly to the extending portion of the thermoplastic polymer interlayer,
      the arm extending away from the mounting portion in a direction that is generally perpendicular to the planar surfaces of the glass layer,
      a portion of the arm projecting into the retaining channel to align and hold the laminate therein, the projecting portion of the arm interlocking the laminate to the support structure thereby to restrict rotational and/or transverse movement of the laminate within the channel or movement of the laminate out of the channel.

2. The glazing element of claim 1 wherein the thermoplastic interlayer is an ethylene copolymer.

3. The glazing element of claim 2 wherein the interlayer is an ethylene copolymer comprising repeating units of an α,β-unsaturated carboxylic acid and/or a derivative thereof.

4. The exterior pressure plate glazing element of claim 1 wherein the retaining channel is formed by a mullion and a pressure plate.

5. The exterior pressure plate glazing element of claim 4 wherein the glazing element is contacted by gaskets which assist in holding the glazing element in the channel.

6. The exterior pressure plate glazing element of claim 1 wherein the laminate further comprises:

a second glass layer having first and second planar surfaces and an edge thereon,
one of the planar surfaces of the second glass layer being bonded to the thermoplastic polymer interlayer with a portion of the thermoplastic polymer interlayer extending past and overlying the edge of the second glass layer, thereby to form a glass/interlayer/glass laminate.

7. The exterior pressure plate glazing element of claim 1 further comprising a fastener that holds the pressure plate and mullion together, and that can be tightened or loosened to apply more or less pressure to the gaskets holding the glazing element.

* * * * *